US008020650B2

(12) United States Patent
Van Maanen et al.

(10) Patent No.: US 8,020,650 B2
(45) Date of Patent: Sep. 20, 2011

(54) CONTROL OF A STARTER-ALTERNATOR DURING A HIGH-VOLTAGE BATTERY FAULT CONDITION

(75) Inventors: Keith D. Van Maanen, Birmingham, MI (US); Sean E. Gleason, West Bloomfield, MI (US); Chandra S. Namuduri, Troy, MI (US); Steven V. Wybo, Grosse Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/407,143

(22) Filed: Mar. 19, 2009

(65) Prior Publication Data
US 2010/0236851 A1    Sep. 23, 2010

(51) Int. Cl.
*B60W 10/00* (2006.01)
*B60L 9/00* (2006.01)
(52) U.S. Cl. ..................................... 180/65.265; 701/22
(58) Field of Classification Search ............. 180/65.265, 180/65.275, 65.21, 65.28, 65.285, 65.29; 701/22; 320/123; 318/400.3; 903/903, 907, 903/930
See application file for complete search history.

(56) References Cited

U.S. PATENT DOCUMENTS

| 5,318,142 | A  | * | 6/1994  | Bates et al.     | 180/65.245 |
|-----------|----|---|---------|------------------|------------|
| 5,698,905 | A  | * | 12/1997 | Ruthlein et al.  | 290/32     |
| 6,003,626 | A  | * | 12/1999 | Ibaraki et al.   | 180/65.25  |
| 6,488,107 | B1 | * | 12/2002 | Ochiai et al.    | 180/65.25  |
| 6,593,713 | B2 | * | 7/2003  | Morimoto et al.  | 318/139    |
| 6,687,580 | B2 | * | 2/2004  | Suzuki et al.    | 701/22     |
| 6,978,854 | B1 | * | 12/2005 | Kuang et al.     | 180/65.235 |
| 6,991,053 | B2 | * | 1/2006  | Kuang et al.     | 180/65.235 |
| 7,258,183 | B2 | * | 8/2007  | Leonardi et al.  | 180/65.1   |
| 2002/0011935 | A1 | * | 1/2002 | Kim              | 340/635    |
| 2009/0058339 | A1 | * | 3/2009 | Kitano           | 318/400.22 |
| 2009/0211826 | A1 | * | 8/2009 | Hashimoto        | 180/65.275 |

* cited by examiner

*Primary Examiner* — J. Allen Shriver, II
*Assistant Examiner* — James M Dolak
(74) *Attorney, Agent, or Firm* — Quinn Law Group, PLLC

(57) ABSTRACT

A method sustains auxiliary power generation aboard a mild hybrid electric vehicle (HEV) in response to a high-voltage (HV) electrical fault condition and executes one of a pair of default limp-home modes depending on the state of the engine at the time of the fault. Each limp-home mode sustains auxiliary power generation during the fault, and at least one mode charges capacitors in the HV bus circuit to provide magnetizing current to a motor generator unit (MGU). An HEV includes a controller and algorithm for sustaining auxiliary power generation during the above fault condition, with the algorithm adapted to control output of an auxiliary power module (APM) and execute one of a pair of default limp-home modes, including a mode in which the APM charges the capacitors to enable a power inverter module (PIM) to provide an initial excitation current to the MGU after the starter motor restarts the engine.

15 Claims, 2 Drawing Sheets

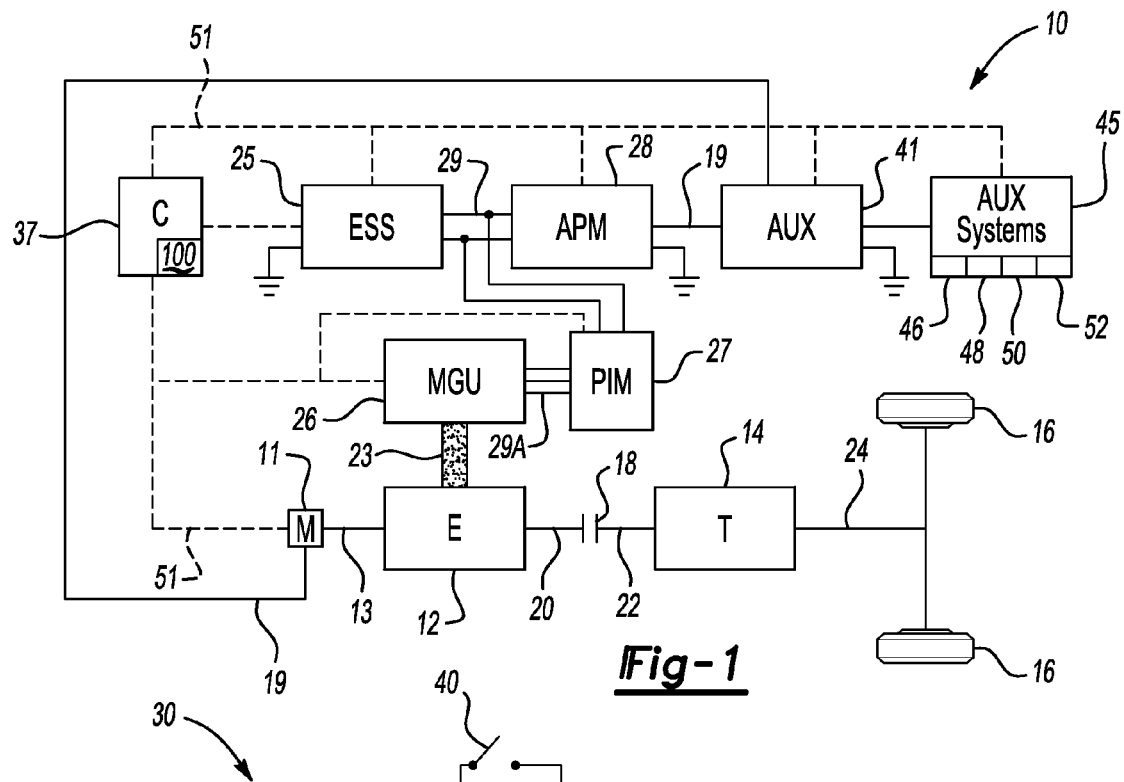
*Fig-1*
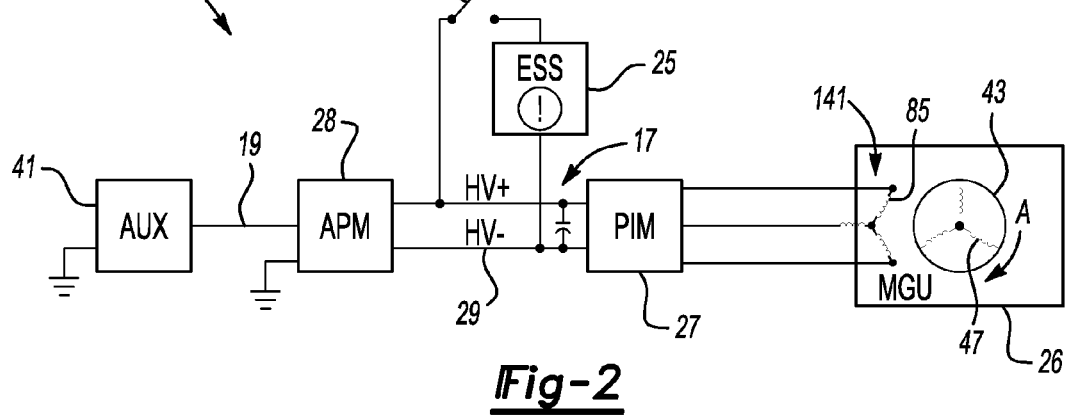
*Fig-2*
| Mode | APM (28) | PIM (27) | Engine (12) |
|---|---|---|---|
| Limp Home I | ←60 | ←70 | ON |
| Limp Home II | | | |
| Boost | 61→ | 71→ | ON |
| Regulate | | 72a→ ←72b | ON |
| Buck | ←63 | ←73 | ON |
*Fig-2A*

CONTROL OF A STARTER-ALTERNATOR DURING A HIGH-VOLTAGE BATTERY FAULT CONDITION

TECHNICAL FIELD

The present invention relates generally to the control of electrical power flow aboard a hybrid electric vehicle, and more particularly to a method and an apparatus for sustaining auxiliary power generation aboard a mild hybrid electric vehicle during a threshold high-voltage electrical fault condition.

BACKGROUND OF THE INVENTION

Hybrid electric vehicles or HEV can selectively utilize different energy sources as needed in order to achieve optimal fuel efficiency. An HEV having a full hybrid powertrain can selectively use either or both of an internal combustion engine and a high-voltage battery module or energy storage system (ESS) for electrical propulsion of the HEV. That is, a typical HEV having a full hybrid powertrain can be propelled via purely electrical means, usually upon starting the HEV and speeds up to a threshold speed, with one or more motor/generator units (MGU) alternately drawing power from and delivering power to the ESS as needed. Above the threshold speed, the engine can provide all of the required propulsive torque. By way of contrast, an HEV having a mild hybrid powertrain lacks means for purely electrical propulsion, while retaining certain fuel-saving design features of the full hybrid designs, e.g., regenerative braking capability for recharging the ESS via the MGU and the ability to selectively shut down or power off the engine at idle during Auto Stop events.

The ability of an HEV to automatically shut off or power down the engine, or Auto Stop functionality, allows otherwise wasted fuel to be conserved during certain idle conditions. In a mild HEV having Auto Stop functionality, the high-voltage MGU can be used as a belt alternator starter (BAS) system in lieu of a conventional alternator. The BAS applies torque to a serpentine belt of the engine when a driver signals an intention to resume travel after an Auto Stop event. Torque from the MGU can turn the engine for a transient duration until a flow of fuel from the vehicle fuel supply can be restored. During cold starting of the engine, a conventional crankshaft-mounted auxiliary or 12-volt starter motor can provide the required amount of cranking torque.

Aboard a mild HEV, a high-voltage battery or energy storage system (ESS) supplying high-voltage electrical power to a voltage inverter within the electrical system of the HEV could become temporarily disconnected or otherwise rendered unavailable. This could result in a loss of or an insufficient field excitation, especially for an asynchronous machine-based MGU, which in turn can result in a loss of sustained auxiliary electrical power generation aboard the HEV. Conventional power flow controller and control methods can respond in a less than optimal manner to such a high-voltage electrical fault condition.

SUMMARY OF THE INVENTION

Accordingly, a method is provided for a mild hybrid electric vehicle (HEV) having a high-voltage motor generator unit or MGU adapted for use as a belted alternator starter (BAS) system. The method sustains auxiliary electrical power generation aboard the HEV when a high-voltage (HV) electrical fault condition is detected, such as when an HV battery or ESS is effectively disconnected or offline, whether due to an electrical fault, system installation issues, or otherwise. A switch or a contactor can be automatically opened in response to such a fault to effectively remove the ESS from the circuit, with the open contactor being one way to diagnose the disconnected ESS. Depending on the on/off operating state of the engine when the HV electrical fault occurs, one of a pair of default limp-home modes are automatically executed in order to provide the HEV with optimized functionality.

In particular, if the HV electrical fault occurs when the engine is still running, an electronic control unit or controller automatically defaults to a first limp-home mode, wherein the engine provides the required propulsive power and the controller sets the required gains and sampling times to values more suitable than those used when the ESS remains available and online. Auxiliary battery charge is maintained via bi-directional power flow through an Auxiliary Power Module (APM) as set forth herein. If the HV electrical fault occurs when the engine is stopped, e.g., during an Auto Stop event, the controller automatically defaults to a second limp-home mode, wherein the controller transitions through a series of steps or sub-modes, including restarting of the engine via an auxiliary starter motor and providing bi-directional power transfer capability through the APM and between various other components of the HEV electrical system.

In the first step of the second limp-home mode, the APM is automatically set to operate in a "boost mode" suitable for rapidly charging a set of DC link capacitors positioned within the high-voltage (HV) bus circuit of the HEV. The MGU is then brought up to speed by cranking the engine using the auxiliary starter motor, drawing power from the LV auxiliary battery, and then driving the MGU via the engine once the engine has started. When the engine reaches a predetermined speed, a second step of the second limp-home mode is executed, during which a power inverter module or PIM is automatically enabled. The PIM regulates the HV bus voltage while the MGU continues to operate in its capacity as a generator. When the HV bus voltage stabilizes within an allowable margin or range of a calibrated set point, a third step of the second limp-home mode is executed. In the third step, the APM is switched to a "buck mode", i.e., a mode which allows the charging of the LV auxiliary battery from the HV bus aboard the HEV. The auxiliary battery then powers one or more auxiliary systems aboard the HEV during the second limp-home mode absent availability of the ESS.

In particular, the method includes detecting a predetermined HV electrical fault condition aboard the HEV, determining an operating state of the engine, and automatically executing one of a pair of default limp-home modes to thereby sustain auxiliary power generation, with the particular limp-home mode selected depending on the operating state of the engine at the time the HV electrical fault is detected.

A mild hybrid electric vehicle (HEV) includes an engine and a motor generator unit (MGU) connected to the engine and adapted for use as a belted alternator system (BAS) for selectively restarting the engine after an Auto Stop event. The HEV also includes a high-voltage (HV) bus and a low-voltage (LV) bus, an HV electrical storage system (ESS) electrically connected to the HV bus, a starter motor, a low-voltage (LV) auxiliary battery, a set of DC link capacitors electrically connected to the HV bus, and an auxiliary power module (APM). The APM is configured to selectively transfer power between the HV bus and the LV bus, and to selectively charge the set of capacitors across the HV bus to a threshold voltage level. A controller detects a predetermined HV electrical fault condition, and sustains auxiliary power generation for recharging the auxiliary battery to a threshold voltage level via the APM during the predetermined HV electrical fault condition. Using the algorithm, one of a pair of default limp-home modes is executed in response to the predetermined HV electrical fault condition, including an engine-off default limp-home mode in which bidirectional power flow control through the APM charges a set of capacitors to provide an initial excitation current to the MGU while the starter motor restarts the engine, thereby allowing the MGU to function as a generator. The auxiliary battery can then be recharged through the APM from the HV bus sustained by the MGU via the power inverter module (PIM).

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a mild hybrid electric vehicle (HEV) having Auto Stop capability and a pair of default limp-home modes in accordance with the invention;

FIG. 2 is a schematic electrical circuit diagram for the HEV of FIG. 1;

FIG. 2A is a table describing the power flow during the default limp-home modes of the HEV of FIG. 1.

DESCRIPTION OF THE PREFERRED EMBODIMENTS

Figure 3:
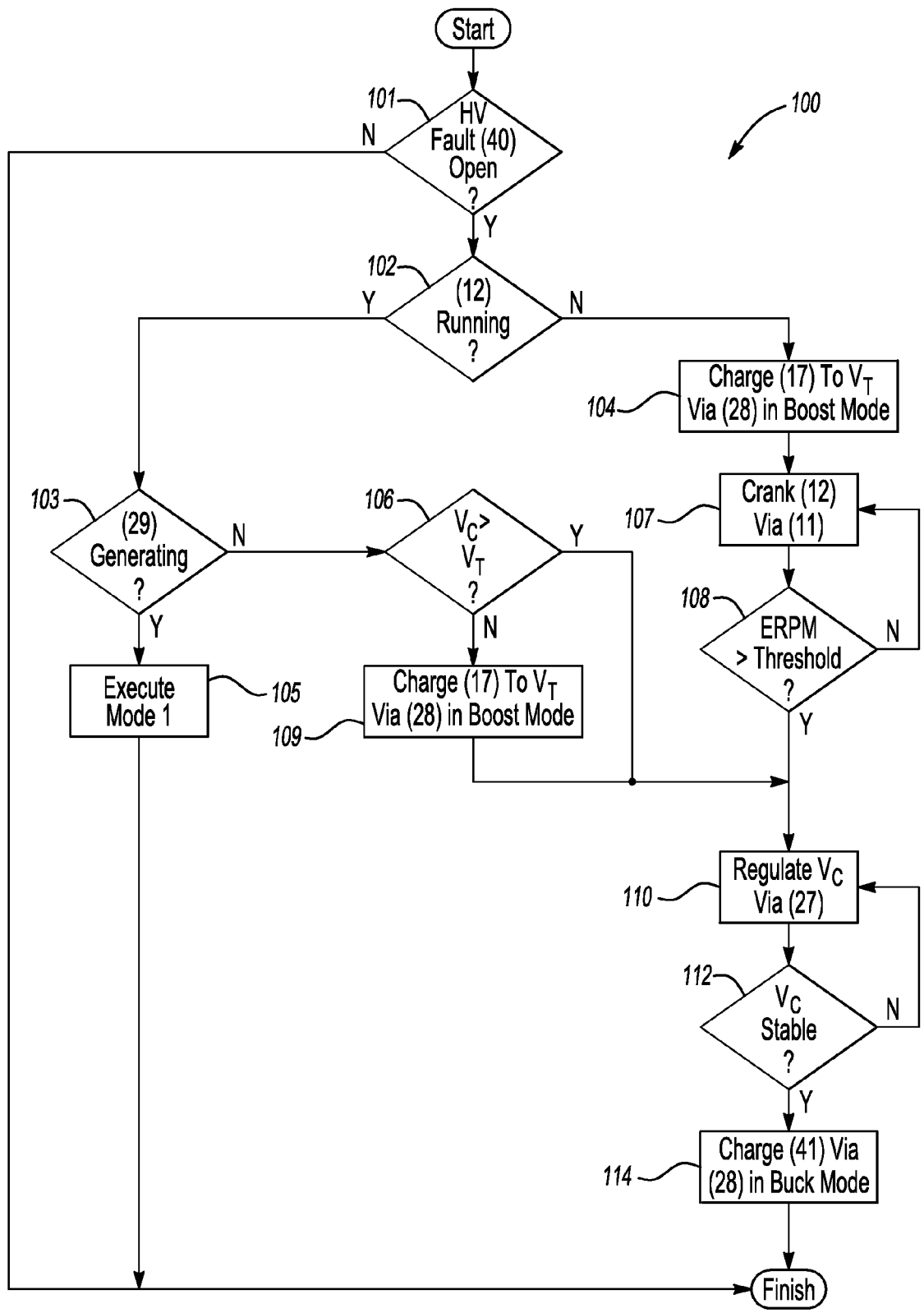
FIG. 3 is a graphical flow chart describing a method for sustaining auxiliary power generation aboard the HEV of FIG. 1.

Referring to the drawings, wherein like reference numbers correspond to like or similar components throughout the several figures, and beginning with FIG. 1, a mild hybrid electric vehicle (HEV) 10 includes an internal combustion engine (E) 12 having an auxiliary starter motor (M) 11 that is generally connected through a gear set (not shown) to a crankshaft 13 of the engine 12. The starter motor 11 is operable for drawing electrical power from a low-voltage (LV) auxiliary battery (AUX) 41 for cranking and starting the engine 12 as needed, such as during an initial start up of the HEV 10 during a cold start, as well as during a predetermined high-voltage (HV) electrical fault condition as explained below.

The HEV 10 also includes an output member 20 and a transmission (T) 14 having an input member 22. The output member 20 of the engine 12 can be selectively connected to the input member 22 of the transmission 14 via a torque transfer mechanism or a clutch device 18, a hydrodynamic torque converter, or other suitable means. The transmission 14 can be an electrically variable transmission or EVT or any other suitable transmission design capable of transmitting propulsive torque to a set of road wheels 16 via a transmission output member 24.

The HEV 10 includes an HV electric motor/generator unit (MGU) 26 that is electrically connected to an HV battery or energy storage system (ESS) 25 via an HV DC bus 29, a voltage inverter or power inverter module (PIM) 27, and an HV AC bus 29a. The MGU 26 can be adapted for use in a belt alternator starter (BAS) system as described above. When configured in this manner, and during normal operation of the HEV 10, the MGU 26 can selectively rotate a serpentine belt 23 or other suitable portion of the engine 12, thereby cranking the engine 12 as needed after an Auto Stop event. The ESS 25 can be selectively recharged via the MGU 26 when the MGU 26 is operating in its capacity as a generator, for example by capturing energy during a regenerative braking event.

The HEV 10 further includes an auxiliary power module or APM 28 which is electrically connected to the ESS 25 via the HV DC bus 29. The APM 28 is also electrically connected to the auxiliary battery 41 via an LV bus 19. The auxiliary battery 41 is a relatively low-voltage energy storage device such as a 12-volt battery, and is suitable for powering the starter motor 11 and one or more accessories or auxiliary systems 45 aboard the HEV 10, for example headlights and/or interior lights 46, a radio or audio system 48, power seats 50, and electric power steering (EPS) system 52, etc.

The APM 28 is configured as a DC-DC power converter adapted to convert a supply of DC power from a high-voltage level to a low-voltage level, and vice versa, as determined by an electronic control unit or controller (C) 37. That is, the APM 28 is operable for converting a relatively high level of voltage from the ESS 25 to a lower voltage level suitable for charging the auxiliary battery 41 and/or directly powering one or more of the auxiliary systems 45 as needed. The controller 37 controls power flow aboard the HEV 10 from the ESS 25 and auxiliary battery 41 to provide the required electrical functionality.

Still referring to FIG. 1, the controller 37 is electrically connected to or otherwise in hard-wired or wireless communication with each of the engine 12, the starter motor 11, the MGU 26, the ESS 25, the APM 28, the PIM 27, and the auxiliary battery 41 via a control channel 51, as illustrated by dashed lines to represent transfer conductors, e.g., a hard-wired or wireless control link or path suitable for transmitting and receiving the necessary electrical control signals necessary for proper power flow control or coordination onboard the HEV 10. The controller 37 can be configured as a distributed or a central control module having such control modules and capabilities as might be necessary to execute all required power flow control functionality aboard the HEV 10 in the desired manner.

Additionally, the controller 37 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the controller 37 or accessible thereby, including a power flow control algorithm 100 in accordance with the invention as described below, can be stored in ROM and executed to provide the respective functionality.

As used herein, the term "Auto Stop" refers to the ability of the HEV 10 to selectively shut down or power off the engine 12 whenever the HEV 10 is idle or at a standstill, such as while waiting at an intersection, in traffic, or when otherwise determined by the controller 37. In this manner, the HEV 10 is able to minimize idle fuel consumption. After an Auto Stop event, the MGU 26 rather than the starter motor 11 acts to rapidly restart the engine 12. The power output of the APM 28 can be monitored to determine various electrical power flow requirements aboard the HEV.

Within the scope of the invention, the controller 37 includes or has access to the algorithm 100 mentioned briefly above, and described below in detail with reference to FIG. 3. The controller 37 utilizes the algorithm 100 to provide sustained power flow in the HEV 10 upon detection or determination of a predetermined HV electrical fault condition, e.g., when the ESS 25 is offline, disconnected, or otherwise unavailable, in part by controlling electrical power flow through the APM 28 in a bi-directional manner as described below.

Referring to FIG. 2, an electrical circuit 30 of the HEV 10 of FIG. 1 includes the auxiliary battery (AUX) 41, with the auxiliary battery 41 being electrically connected to the APM 28 via the LV bus 19. The APM 28 in turn is electrically connected to the PIM 27 via the HV DC bus 29. The MGU 26, which includes a stator 141 and a rotor 43, is electrically connected to the PIM 27 as shown. A field generated around coils or windings 85 of the stator 141 ultimately induces an opposing field in coils or windings 47 of the rotor 43, thereby rotating the rotor 43 as indicated in FIG. 2 by the arrow A. A set of DC link capacitors 17 is positioned across the HV DC bus 29, and a high-voltage switch, relay, or contactor 40, e.g., a single-pole version as shown in FIG. 2, is positioned in such a way as to disconnect one or both of the leads of the ESS 25 from the corresponding leads of the HV DC bus 29, with the corresponding leads of the HV DC bus 29 labeled HV⁺ and HV⁻ in FIG. 2 for clarity.

The controller 37 of FIG. 1, using the algorithm 100 described below with reference to FIG. 3, is configured to selectively operate in response to the HV electrical fault condition aboard the HEV 10 of FIG. 1. That is, the controller 37 provides one of two different default limp-home modes for the HEV 10, with the modes providing a stable control of HV bus voltage via the PIM 27 and a buck mode for recharging the auxiliary battery 41 via the APM 28, and with one of the modes providing a boost mode for charging one or more high-voltage DC link capacitors 17 across the HV DC bus 29 for use in exciting the MGU 26 upon engine start up, each of which will now be described with reference to FIG. 2A.

Referring to FIG. 2A in conjunction with the circuit 30 of FIG. 2, various power flow arrows 60, 61, 63, 70, 71, 72, and 73, describe the direction of electrical power flow in the circuit 30 of FIG. 2 during a pair of default limp-home modes, i.e., Limp Home I and II. The default limp-home modes can be entered when the threshold HV electrical fault condition is present aboard the HEV 10 of FIG. 1. The threshold fault condition is exemplified in one embodiment herein by a disconnected or otherwise unavailable or offline ESS 25, as indicated by the "!" symbol and an open contactor 40 in FIG. 2. That is, in response to a detected HV fault condition, the contactor 40 is automatically opened to thereby effectively remove the ESS 25 from the circuit 30. The default limp-home modes are then determined by the controller 37 depending upon the operating state of the engine 12 and the MGU 26 at the time such an HV electrical fault is detected.

If the engine 12 is running and the MGU 26 is generating when the HV electrical fault condition occurs, a first default limp-home mode, Limp Home I, is executed, during which the engine 12 supplies mechanical power to the MGU 26, allowing the MGU 26 to operate in its capacity as a generator. Electrical power is thus generated by the MGU 26 and supplied to the PIM 27, and after inversion, to the APM 28 as DC power, as indicated by the respective power flow direction arrows 60 and 70. With the engine 12 propelling the HEV 10, power flow is provided to the auxiliary battery 41, which allows the auxiliary systems 45 of FIG. 1 to remain energized.

However, if the engine 12 is not running or the MGU 26 is not generating when the HV electrical fault condition occurs, a second default limp-home mode (Limp Home II) is executed. The second default limp-home mode can be executed in a series of steps. In step one, the controller 37 must use the starter motor 11 to crank the engine 12 via the auxiliary battery 41 to thereby start the engine 12 if the engine 12 is not already running. In the next step, or Boost Mode, and after the engine 12 is running, the controller 37 signals the APM 28 to pass electrical current from the auxiliary battery 41 through the APM 28, as indicated by the direction of the power flow arrow 61 in FIG. 2A, to thereby charge the DC link capacitors 17 to a predetermined voltage ($V_C$ in FIG. 3 described below). The engine 12 provides the necessary torque for rotating the rotor 43 of the MGU 26. In Boost Mode, the PIM 27 also sources magnetizing current needed for an asynchronous machine-based MGU from the APM 28 to the windings 85 of the stator 141, as indicated by the direction of the power flow arrow 71.

In step three, i.e., Regulate Mode, the PIM 27 controls the MGU 26 so that the MGU 26 operates in its capacity as a generator, with a DC voltage that is higher than the voltage provided by the APM 28 in Boost Mode. The PIM 27 provides magnetizing current (power flow arrow 72A) to the stator 141 using the capacitors 17, and helps sustain the charge on the capacitors 17 (power flow arrow 72B) using torque from the MGU 26. In Regulate Mode, once the voltage of the capacitors 17 exceeds a calibrated set point, e.g., approximately 70V or more in one exemplary embodiment, the APM 28 stops providing power to the capacitors 17.

In step four or Buck Mode, the MGU 26 continues to operate in its capacity as a generator, thus sustaining the charge on the capacitors 17 as indicated by the power flow arrow 73. The APM 28, which is no longer charging the capacitors 17, switches to charging of the auxiliary battery 41 as indicated by the power flow arrow 63 in FIG. 2A. During each of the modes, the speed of the engine 12 can be limited to less than a predetermined level, e.g., approximately 4000 RPM or less in one exemplary embodiment, in order to provide tighter or more optimal control of the voltage levels of the HV DC bus 29.

Referring to FIG. 3, the algorithm 100 begins with step 101, where it is determined whether a predetermined high-voltage (HV) electrical fault condition is present, which results in a disconnected ESS 25. Whether achieved separately or in conjunction with the algorithm 100, detection of the HV electrical fault condition opens the contactor 40 of FIG. 2, and therefore the position of the contactor 40, and/or any values sensed in order to open the contactor 40, can be used at step 101 to determine the presence or absence of the predetermined HV electrical fault condition. If the predetermined HV electrical fault condition is present which results in an open contactor 40, the algorithm 100 proceeds to step 102, otherwise the algorithm 100 is finished.

At step 102, it is determined whether the engine 12 is already running. If the engine 12 is running at the time of the predetermined HV electrical fault condition, the algorithm proceeds to step 103. If the engine 12 is not running at that time, the algorithm 100 proceeds to step 104.

At step 103, the algorithm 100 determines whether the MGU 26 is actively generating power. If so, the algorithm 100 proceeds to step 105. Otherwise, the algorithm 100 proceeds to step 106.

At step 104, having determined at step 102 that the engine 12 is not running during the predetermined HV electrical fault, the APM 28 is set to operate in the "Boost Mode" of the second limp-home mode, i.e., Limp Home II of FIG. 2A, wherein one or more capacitors 17 connected across the HV DC bus 29 are rapidly charged to a predetermined voltage level, i.e., $V_T$. This value is calibrated, and can vary with the design of the HEV 10. In one exemplary embodiment, the threshold voltage $V_T$ is approximately 75-80 volts or more, although other values can be selected without departing from the intended scope of the invention. After charging the capacitor(s) 17, the algorithm 100 proceeds to step 107.

At step 105, the algorithm 100 executes a first "limp-home" control mode, i.e., Limp Home I of FIG. 2A, wherein the various gains and sampling times will be set to more suitable values relative to those used when the ESS 25 is available. In the first limp-home mode, the engine 12 powers the MGU 26 as a generator, with the PIM 27 providing stable control of the voltage of the HV DC bus 29 until the ESS 25 is again online. In Limp Home I, the functionality of the Buck Mode described above is provided, with Limp Home I differing from Limp Home II in the lack of a Boost Mode and a Regulate Mode, which are not required due to the running state of the engine 12 and MGU 26. The algorithm 100 is then finished.

At step 106, having determined at step 103 that the engine 12 is running but the MGU 26 is not generating, the DC bus capacitor voltage $V_C$ is checked against a predetermined threshold $V_T$. If $V_C < V_T$, the APM 28 is set to operate in the Boost Mode of the second limp-home mode, i.e., Limp Home II of FIG. 2A, and the algorithm 100 proceeds to step 109. If $V_C > V_T$, then the algorithm 100 proceeds directly to step 110.

At step 107, the engine 12 is cranked and started via the starter motor 11 using the auxiliary battery 41, and the MGU 26 is energized via the voltage ($V_C$) that is stored in the capacitors 17. Speed of the MGU 26 is increased. As the speed is increasing, the algorithm 100 proceeds to step 108.

At step 108, the algorithm compares the present speed of the engine 12, abbreviated ERPM, to a calibrated speed threshold. The algorithm 100 repeats steps 108 and 107 in a loop until the value of the engine speed ERPM meets or exceeds the calibrated threshold, at which point the algorithm 100 proceeds to step 110.

At step 109, one or more capacitors 17 connected across the HV DC bus 29 are rapidly charged via the APM 28 to a predetermined voltage level, i.e., $V_T$. This value is calibrated, and can vary with the design of the HEV 10. In one exemplary embodiment, the threshold voltage $V_T$ is approximately 75-80 volts or more, although other values can be selected without departing from the intended scope of the invention. After charging the capacitor(s) 17, the algorithm 100 proceeds to step 110.

At step 110, the controller 37 enters the Regulate Mode or step described above with reference to FIG. 2A, wherein the controller 37 enables the PIM 27 to regulate the voltage of the HV DC bus 29 with the MGU 26 operating in its capacity as a generator. As the PIM 27 regulates this voltage, the algorithm 100 proceeds to step 112.

At step 112, the algorithm 100 determines whether the voltage of the HV DC bus 29 has stabilized to within a predetermined margin or range of a calibrated set point. Step 112 repeats in a loop with step 110 until the algorithm 100 determines that the voltage of the HV DC bus 29 is stable, and then proceeds to step 114.

At step 114, the algorithm 100 switches to Buck Mode, i.e., step three of the second limp-home mode (Limp Home II), in which the APM 28 directs power to the auxiliary battery 41, thereby recharging the auxiliary battery 41.

Using the algorithm 100 described above in conjunction with the HEV 10 of FIG. 1, improved limp-home capability is provided for an HEV having a high-voltage BAS system. Power flow is sustained to certain on-board auxiliary electrical systems, such as an electric power steering (EPS), the auxiliary systems 45 exemplified above, and/or other auxiliary devices, when the high-voltage battery or ESS 25 is disconnected or otherwise unavailable.

While the best modes for carrying out the invention have been described in detail, those familiar with the art to which this invention relates will recognize various alternative designs and embodiments for practicing the invention within the scope of the appended claims.

The invention claimed is:

1. A method for sustaining auxiliary power generation aboard a mild hybrid electric vehicle (HEV) having an engine, a low-voltage (LV) auxiliary battery, a high-voltage (HV) energy storage system (ESS), at least one auxiliary system powered by the LV auxiliary battery, an auxiliary power module (APM), and a set of capacitors positioned within an HV bus circuit of the HEV, the method comprising:
    detecting a predetermined high-voltage (HV) electrical fault condition aboard the HEV;
    determining an operating state of the engine; and
    automatically executing one of a first and a second default limp-home mode in response to the HV electrical fault condition;
    wherein each of the first and second default limp-home modes corresponds to a different operating state of the engine, and wherein each default limp-home mode sustains auxiliary power generation to thereby continuously energize the at least one auxiliary system during the predetermined HV electrical fault condition, and
    wherein executing the second limp-home mode includes selectively controlling a flow of electrical power through the APM to thereby charge the set of capacitors to a threshold voltage level.

2. The method of claim 1, wherein each of the first and the second limp-home modes sustains auxiliary power generation at least in part by recharging the LV auxiliary battery.

3. The method of claim 1, wherein the HEV includes a power inverter module (PIM) and a high-voltage motor generator unit (MGU) having stator windings, and wherein executing the second limp-home mode includes selectively controlling a flow of electrical power from the APM through the PIM to thereby source a magnetizing current to a set of stator windings of the MGU.

4. The method of claim 3, including an auxiliary starter motor, the method further comprising: cranking the engine using the auxiliary starter motor until a rotor portion of the MGU reaches a threshold speed.

5. The method of claim 4, including automatically enabling the PIM to regulate an HV voltage level of the HV bus circuit aboard the HEV while the MGU operates in its capacity as a generator.

6. The method of claim 5, including allowing the HV voltage level of the HV bus circuit to stabilize to within a predetermined range of a calibrated set point, and then directing the flow of electrical power through the APM to thereby recharge the LV auxiliary battery to a threshold auxiliary voltage level.

7. A method for sustaining auxiliary power generation aboard a mild hybrid electric vehicle (HEV) having an engine, an auxiliary power module (APM), a power inverter module (PIM), a low-voltage (LV) auxiliary battery, a high-voltage (HV) energy storage system (ESS), a high-voltage motor generator unit (MGU), and at least one auxiliary system powered by the LV auxiliary battery, the method comprising:
    detecting a disconnected ESS;
    executing a first default limp-home mode when the engine is running at the time that the disconnected ESS is detected, thereby charging the LV auxiliary battery in one manner;
    executing a second default limp-home mode when the engine is not running or the MGU is not generating at the time that the disconnected ESS is detected, thereby charging the LV auxiliary battery in another manner while the ESS is disconnected, including:
  charging a set of capacitors in an HV bus circuit of the HEV to a threshold capacitor voltage by controlling a flow of electrical power through the APM from the LV auxiliary battery;
  starting the engine using an auxiliary starter motor to thereby rotate a rotor portion of the MGU;
  controlling the PIM to thereby regulate a flow of electrical power to and from the MGU through the PIM; and
  charging the LV auxiliary battery by controlling a flow of electrical power through the APM once the threshold capacitor voltage is reached.

8. The method of claim 7, further comprising: limiting a speed of the engine to less than a threshold speed during each of the first and the second limp-home modes.

9. The method of claim 8, wherein the threshold speed of the engine is less than approximately 4000 RPM.

10. The method of claim 7, further comprising:
  enabling an outlet flow of electrical power from the PIM only when the engine exceeds a calibrated threshold speed.

11. The method of claim 9, wherein the threshold capacitor voltage is greater than approximately 70V.

12. A mild hybrid electric vehicle (HEV) comprising:
  an engine;
  a motor generator unit (MGU) operatively connected to the engine, wherein the MGU is adapted for use as a belted alternator system (BAS) operable for selectively restarting the engine after an Auto Stop event;
  a high-voltage (HV) bus;
  an HV electrical storage system (ESS) electrically connected to the HV bus;
  a low-voltage (LV) bus;
  an auxiliary starter motor;
  an auxiliary battery electrically connected to the auxiliary starter motor via the LV bus;
  a set of capacitors electrically connected to the HV bus;
  an auxiliary power module (APM) configured to selectively transfer electrical power between the HV bus and the LV bus, and to selectively charge the set of capacitors to a threshold voltage level; and
  a controller having an algorithm for detecting a predetermined HV electrical fault, and for sustaining auxiliary power generation aboard the HEV during the HV electrical fault;
  wherein the algorithm is adapted to control the power output of the APM to thereby automatically execute one of a pair of default limp-home modes in response to the predetermined HV electrical fault, including at least one default limp-home mode in which the APM recharges the LV auxiliary battery and at least one default limp-home mode in which the APM provides an initial excitation current to the MGU via the set of capacitors while the auxiliary starter motor restarts the engine after the Auto Stop event.

13. The HEV of claim 12, further comprising a power inverter module (PIM), wherein the controller is further adapted for enabling the PIM to regulate the voltage of the HV bus when the MGU is operating in its capacity as a generator.

14. The HEV of claim 12, wherein the controller is adapted to limit the speed of the engine during each of the pair of limp-home modes.

15. The HEV of claim 12, wherein the MGU is an asynchronous machine.

* * * * *